US006981619B2

United States Patent
Moretto

(10) Patent No.: US 6,981,619 B2
(45) Date of Patent: Jan. 3, 2006

(54) HIGH PRECISION METERING AND/OR ADDITIONING DEVICE, PARTICULARLY FOR GRANULAR MATERIALS

(75) Inventor: Renato Moretto, Massanzago (IT)

(73) Assignee: Moretto Plastics Automation Srl, Massanzago (IT)

( * ) Notice: Subject to any disclaimer, the term of this patent is extended or adjusted under 35 U.S.C. 154(b) by 196 days.

(21) Appl. No.: 10/685,434

(22) Filed: Oct. 16, 2003

(65) Prior Publication Data
US 2004/0079767 A1    Apr. 29, 2004

(30) Foreign Application Priority Data
Oct. 16, 2002    (IT)    ........................... VR2002A0101

(51) Int. Cl.
G01F 11/01    (2006.01)
(52) U.S. Cl. ....................... 222/353; 222/461; 222/344; 222/504; 222/196; 222/197; 141/192; 251/315.16; 177/116
(58) Field of Classification Search ................ 222/461, 222/462, 554, 21, 168.5, 170, 218, 344, 355, 222/358, 361, 367, 425, 444, 452, 456, 362, 222/353, 504, 548, 196, 197; 137/204; 141/83, 141/192; 251/315.16; 177/116
See application file for complete search history.

(56) References Cited

U.S. PATENT DOCUMENTS

| 548,846 | A | * | 10/1895 | Richards ..................... 177/116 |
| 1,723,211 | A | | 8/1929 | Schmidt |
| 4,130,268 | A | * | 12/1978 | Kojima et al. .............. 251/298 |
| 4,867,258 | A | * | 9/1989 | Narukawa et al. .......... 177/116 |
| 5,437,393 | A | | 8/1995 | Blicher et al. |
| 6,091,028 | A | * | 7/2000 | Ozaki et al. .................... 177/1 |
| 6,121,556 | A | | 9/2000 | Cole |
| 6,397,906 | B2 | * | 6/2002 | Hansen ....................... 141/196 |
| 6,412,756 | B1 | * | 7/2002 | Hayduk ................... 251/315.1 |

FOREIGN PATENT DOCUMENTS

EP        0 269 285 A    6/1988

* cited by examiner

Primary Examiner—Michael Mar
Assistant Examiner—M A Cartagena
(74) Attorney, Agent, or Firm—Nixon & Vanderhye P.C.

(57) ABSTRACT

Method and device for metering granular materials which comprises a least one dispensing element, driving means arranged to control the dispensing element, sensing means designed to detect the amount of granules delivered by the dispensing element, and a program control unit designed to control the control means and disable it as soon as the amount of granules delivered by the dispensing element has reached a predetermined amount. Each dispensing element (2) is mounted for rotation about an axis of oscillation or rotation, and has an elbow-shaped duct (11) extending transversely with respect to the axis of oscillation, so that is has a first substantially vertical duct portion (11a) that, in use, is permanently filled with granular material, and a second duct portion (11b), extending transversely with respect to the first portion (11a) and in communication therewith, so that, in use, it constantly contains granular material which, in a rest condition, is kept in it owing to the angled configuration of the duct. The driving means are designed to impart an oscillation movement about the axis of oscillation, so that the granules of material are delivered by the second duct portion of the dispensing element (2) each time the dispensing element is caused to oscillate.

21 Claims, 3 Drawing Sheets

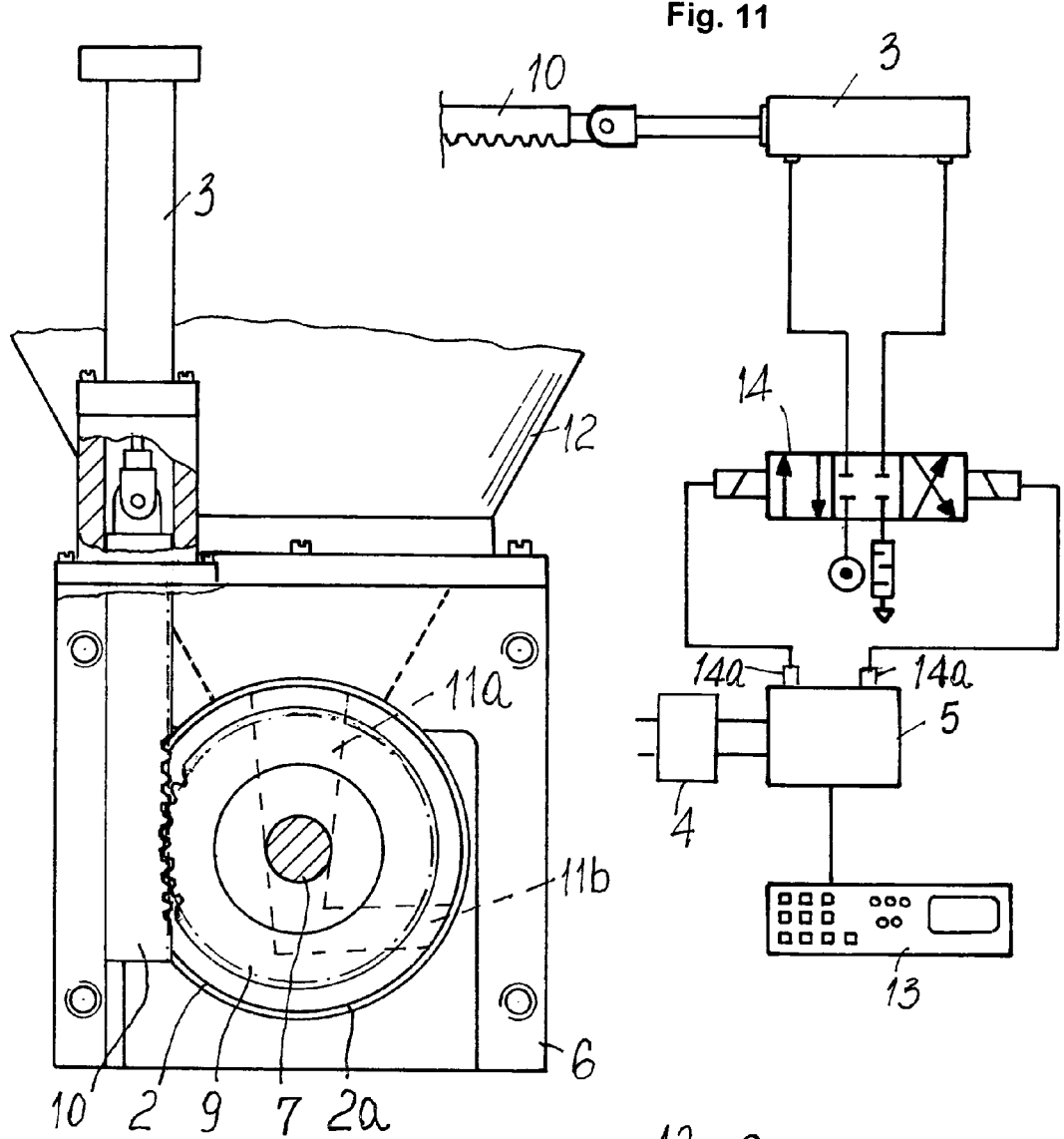
Fig. 11
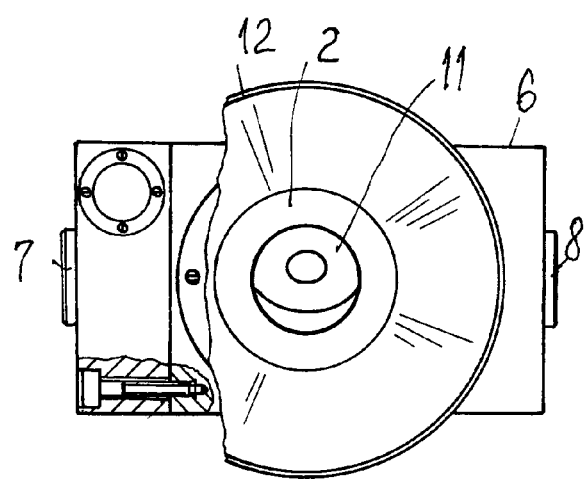
Fig. 5
Fig. 6

HIGH PRECISION METERING AND/OR ADDITIONING DEVICE, PARTICULARLY FOR GRANULAR MATERIALS

BACKGROUND OF THE INVENTION

The present invention relates to a method, particularly suitable for granular materials, of metering and additioning a material with great precision.

In the plastics materials processing, or treatment, industry the need is increasingly felt to add small or very small amounts of one or more specified additives such as dyes, foaming agents, lubricating agents and the like to a given mixture, also referred to as a batch, already prepared and bound to be subjected to processing, or treatment.

In treatment processes, where the hourly throughput of mixture of plastics granular material to be processed, or treated, is relatively low, the percentage amounts of additive to be added to the mixture before the treatment process can turn out to be very small, if not negligible.

Thus, the need arises for metering and/or additioning means that, besides providing for small and very small set amounts of granular material to be added, also provides for consistency in the set amounts of additive to be achieved with time.

It has already been proposed in the prior art the use of gravimetric metering devices that are suitable (usually by being set through a control keyboard) for metering a desired amount by weight of granular material. A gravimetric metering device is suitable for metering e.g. a 500 g batch or charge of granular material approximately every 20 seconds.

DESCRIPTION OF PRIOR ART DRAWINGS

On the other hand, a volumetric metering device is used (to complement gravimetric metering systems) for metering small or very small amounts of granular additives, e.g. of the type as diagrammatically shown in FIGS. 1 to 4 of the accompanying drawings that diagrammatically illustrate a volumetric metering device in two operating positions.

FIGS. 1 and 2 are two longitudinal axial section views, and

FIGS. 2 and 4 each show a view taken along line 11—11 in FIG. 1 and line IV—IV in FIG. 3, respectively.

The volumetric metering device shown is provided with a duct or tube T in which a metering screw, or worm V, is mounted, and driven by motor M that and has the function of removing granules from the duct or tube T. The granules removed by metering screw or worm V fall onto a balance that weighs the batch of dispensed granules and, once the set weight has been reached, transmits a control signal to stop rotation of screw V.

Such volumetric metering system is heavily limited by two major drawbacks. Firstly, upon receiving a stop signal, motor M does not stop in a regular fashion, but is affected by e.g. differences in the load applied on worm V that may be due to a number of reasons such as heterogeneous granulometry of the granules, load level in the hopper, type of rubber material, or the like. Secondly, as it is better apparent when comparing FIGS. 1 and 2, a change in attitude of worm V in its starting position and in its stopping position can result in a respective variation in the amount of unloaded material which, in the worst situation, corresponds to a capacity equalling half a pitch of the worm. Moreover, if the worm V is stopped in a position such as that shown in FIG. 1, it becomes an obstacle preventing the last uppermost granules from falling.

Such inaccuracies may result in a weighing error that can reach 50%, and thus a volumetric metering device is unsuitable for ensuring constant quality in the final result.

SUMMARY OF THE INVENTION

The main object of the present invention is to provide a novel method of metering and/or additioning repeatedly and constantly with the time even extremely small amounts of granular material. Another object of the present invention is to provide a highly precise metering device suitable for providing repeated metering operations constant with time.

A further object of the present invention is to provide a metering device that can be used together with a less precise metering device of any suitable type, either volumetric or gravimetric.

According to a first aspect of the present invention there is provided a method of precisely metering and/or additioning a granular material, comprising:

providing a motor-driven dispensing element mounted for rotation about an axis of oscillation, or partial alternating rotation and having a through duct substantially shaped as an elbow, extending transversely with respect to said axis of oscillation, an end of said through-duct being in communication with a feeding source of granular material, whereas the other end thereof constantly contains granular material;

causing said dispensing element to alternatingly swivel, or oscillate to discharge granules through said other end thereof in a pulsed manner, throughout a number of cycles corresponding to a specified amount of granules to be dispensed, and stopping any oscillation of said dispensing element upon reaching a predetermined weight threshold of dispensed-discharged granules.

Advantageously, the angle of oscillation of said dispensing element is a function of the inner light of said through duct and can range from 10 and 90 degrees.

According to another aspect of the present invention, there is provided a high precision metering device for granular materials, which comprises at least one dispensing element, driving means arranged to control said dispensing element, and a program control unit suitable for controlling said driving means and stopping upon reaching a predetermined amount of granules dispensed by said dispensing element, and characterised in that said dispensing element, or each dispensing element, is mounted for rotation about an axis of oscillation or partial rotation and has a duct substantially shaped as an elbow, extending transversely with respect to said axis of rotation, thereby having a first substantially vertical portion which, in use, is permanently filled with granular material, and a second portion extending in a transverse direction with respect to said first portion and being in communication therewith, thus constantly containing granular material which, in a rest condition, is held therewithin owing to its angled orientation, and said driving means is designed to cause, upon control, said dispensing element to swivel or oscillate about said axis of rotation, thereby causing granules of material to be released from said second portion of said dispensing element.

BRIEF DESCRIPTION OF THE DRAWINGS ILLUSTRATING THE INVENTION

Further features and advantages of the present invention will be better apparent from the following detailed description of some currently preferred embodiments given only by way of indicative not limiting examples with reference to the accompanying drawings, in which:

FIG. 5 is a diagrammatic front elevation view of a metering device according to the present invention;

FIG. 6 shows a top plan view with parts in cross-section of the metering device shown in FIG. 5;

FIG. 11 shows an operating diagram of a metering device according to the present invention.

DETAILED DESCRIPTION OF PREFERRED EMBODIMENTS OF THE INVENTION

With reference to the above listed Figures, it will be noted that a high precision metering device for granular materials generally designated at 1 according to the present invention comprises a dispensing element designed as a rotor 2 substantially cylindrical in shape, preferably made of a light material such as Nylon®, or another suitable plastics material, preferably covered with a metal jacket 2*a*, e.g. made of an aluminium or other light alloy;—driving means arranged to control said dispensing element, preferably comprising a linear actuator 3, e.g. a fluid (e.g. compressed air) operated cylinder and piston assembly having a relatively small diameter to be suitable for moving fast, and sensing means 4 designed to gauge the amount of granules delivered by rotor 2, e.g. comprising an electronic balance of any suitable type and not described herein as it is well-known to the skilled person in the art, and a program control unit such as a PLC or electronic card 5, adapted to control linear actuator 3 and stop it as soon as a predetermined amount of granules delivered by rotor 2 has been reached.

Figure 1:
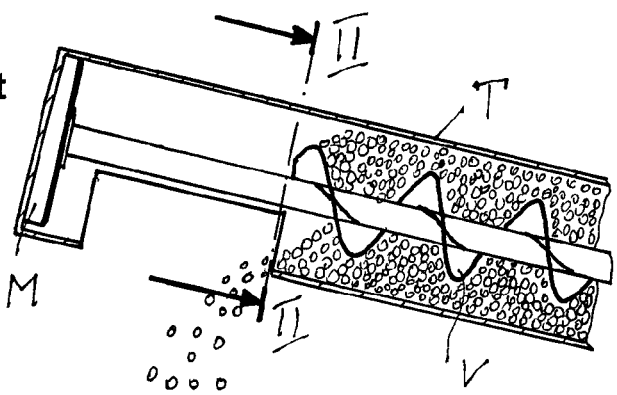
FIGS. 1–4 are different views of a volumetric metering device of the prior art.
Figure 2:
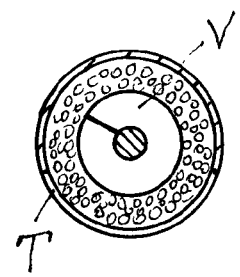
Figure 3:
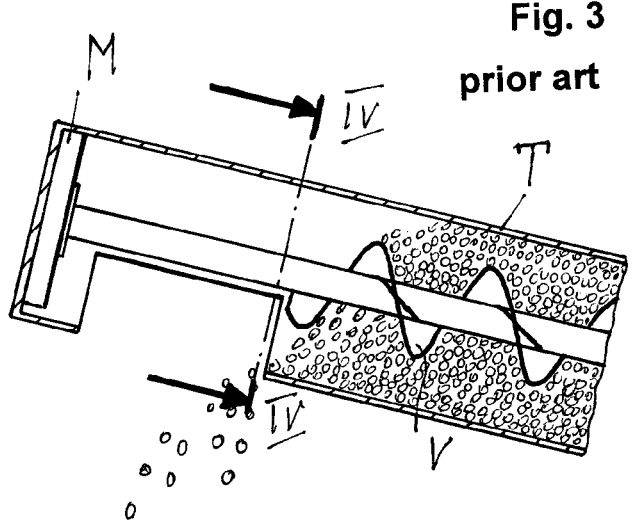
Figure 4:
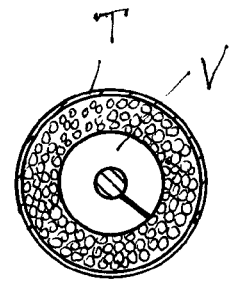
Figure 7:
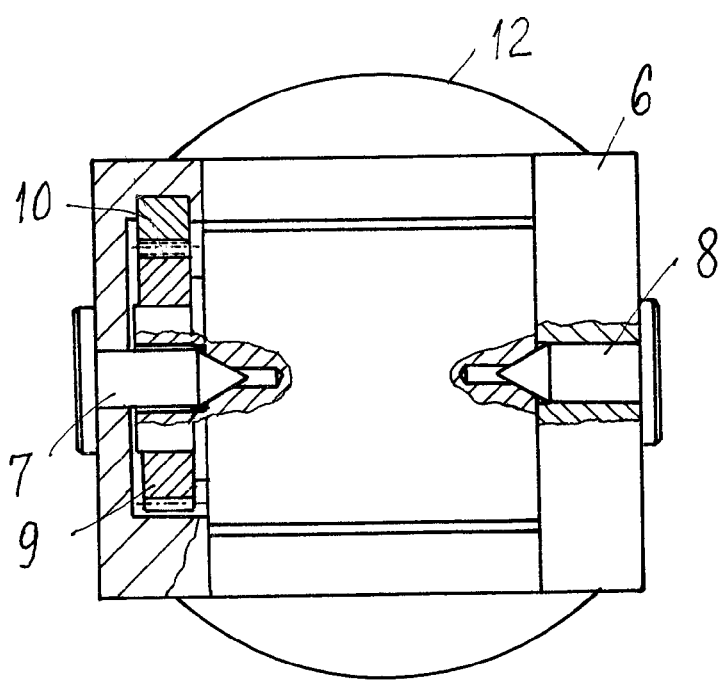
FIG. 7 is a bottom plan view with parts in cross-section of the metering device shown in FIG. 5.

More particularly, the dispensing element, or rotor 2, is supported by a support frame 6, e.g. made of stainless steel, and mounted for rotation about a horizontal axis of swivelling, or partial rotation, e.g. on two pins 7 and 8 made of e.g. hardened steel, and arranged opposite to, and axially aligned with one another to allow rotor 2 to be doubly centred (FIG. 7).

Rotor 2 is integral in rotation at one side face thereof with a toothed wheel 9, coaxial with it and meshing with a movable rack 10, which is, in turn, controlled by fluid-operated assembly 3. Rack 10 is preferably made of a suitable wear-and-tear resistant, preferably friction proof, plastics material, preferably nylon®, to prevent seizing and limit noise during operation.

With the above described structure, it is possible to remove rotor 2 together with its gearing assembly 10, and smoothly replace it with another rotor 2 having a differently sized inner duct or opening 11, and thus a metering device according to the present invention can be used for a wide range of materials and granule sizes, or granulometries. For this purpose, it sufficient to remove a fairing plate, removably applied to frame 6, to remove an installed rotor and possibly replace it with another rotor having a different piston displacement and/or gauge by carrying out the same operations in reverse order.

In rotor 2 the through duct or hole 11 is formed, which is substantially elbow-shaped and extends transversely with respect to the axis of rotation, so as to have a first substantially vertical duct section 11*a* that, in use, is permanently filled with granular material, and a second duct portion 11*b* extending transversely with respect to duct portion 11*a* and in communication with it, so as to constantly contain granular material which, in rest condition, is held therein owing to its angled orientation with respect to duct portion 11*a*. Duct portion 11*a* is in communication with a granular material feeding source, typically a hopper 12 located above rotor 2 and preferably supported by the support frame 6, so that its lower discharge outlet is in direct communication with the portion 11*a* of duct 11.

Preferably, duct portion 11*a* has a structure, e.g. it is frusto-conical in shape, so that its inner light tapers towards duct portion 11*b*, whereas duct portion 11*b* can have a uniform inner light, e.g. cylindrical in shape.

The toothed wheel-rack assembly 9, 10, driven by jack 3, is arranged to cause rotor 2 to swivel or oscillate though angles that can range from 10 to 90 degrees, preferably from 40 to 60 degrees. Upon each angular displacement or oscillation, the rotor releases a predetermined amount of granules that fall out of duct portion 11*b* to be gathered onto the underlying electronic balance 4 which measures their weight and, once a weight threshold preset in the control unit 5 through a keyboard 13 has been reached, generates a control signal that, via control unit 5, causes e.g. an on-off electrovalve 14 to be switched on, electrovalve 14 being preferably being connectable to control unit 5 by means of a pair of connectors 14*a*, or any other suitable means for controlling driving assembly 3.

The metering device is suitable for taking only 40 milliseconds to effect a swivelling or oscillation cycle, i.e. a partial rotation in one and in the opposite, directions.

In a typical application, metering device 1 described above can be used as an auxiliary precision unit suitable for being fitted into each metering station of a gravimetric metering device, e.g. a gravimetric metering device disclosed and illustrated in U.S. patent application Ser. No. 10/397,370 filed on Mar. 27, 2003 in the name of the same Applicant as in the present invention, wherein on-off electrovalve 14 can be mounted on the hopper of each metering station.

In such a case, control unit 5 will be that already provided in the gravimetric metering device, and each cycle will be suitable for being set e.g. as follows:

1. Discharge time (clockwise rotation)
2. Discharge pause time
3. Return to position (anticlockwise rotation).

The number of cycles to be carried out will depend on the set values to reach a weight or a desired amount of granular material, always expressed as a multiple of a very small amount equal to or higher than 0.1 g per cycle. In this a way, an average metering is accomplished, resulting from a series of fine metering operations, and thus the metering error can be maintained at such low levels as to be regarded as negligible for all practical purposes, e.g. in the plastics materials processing or treatment, industry. In any case, a metering device according to the present invention is 40 to 50 times more precise than the best industrial metering devices currently adopted in the field of plastics material processing.

The invention described above is susceptible to numerous modifications and variations within the scope defined by the claims.

Figure 8:
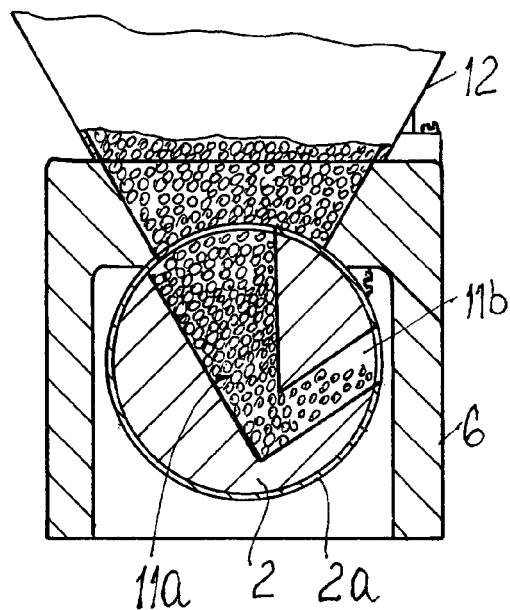
FIGS. 8, 9 and 10 are diagrammatic section views showing modifications of the elbow-shaped duct formed in the dispensing element.
Figure 9:
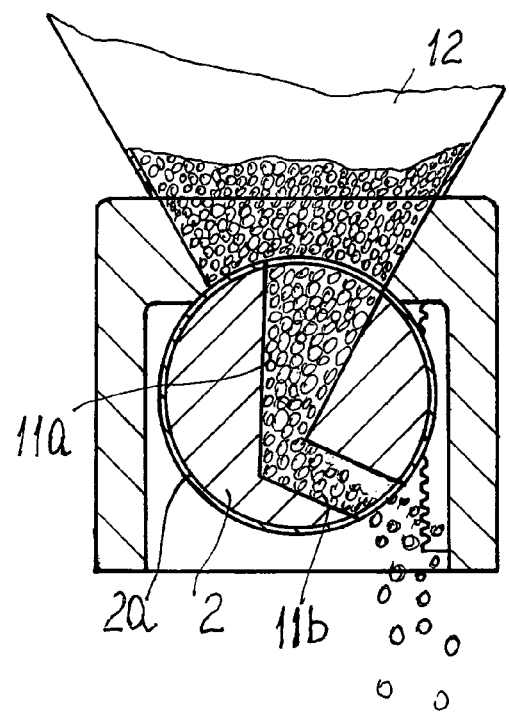
Figure 10:
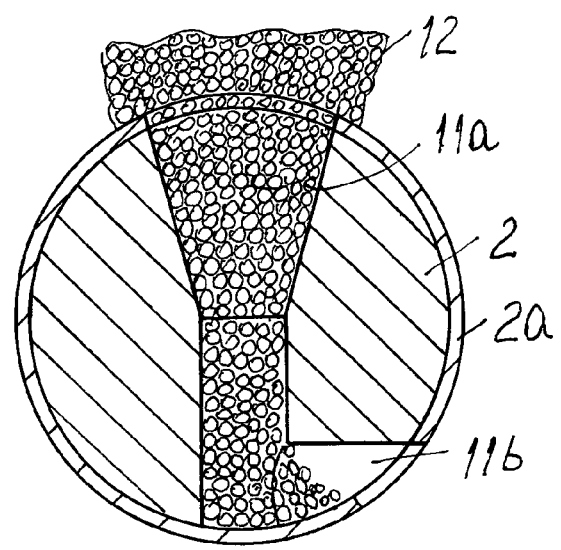

Thus, for example, as shown in FIGS. 8 to 10, the angle between duct portions 11a and 11b, as well as the structure of duct portion 11a can vary according to specific application-related requirements. As shown in FIG. 10, duct portion 11a has also a portion whose light is cylindrical in shape between a conically shaped end portion and duct portion 11b.

Moreover, the metering device described above is designed to be assembled together with one or more metering devices of the same type to form an overall multiple metering device for metering very small quantities of as many types of granular materials as the number of metering devices.

What is claimed is:

1. A method of metering granular material, which comprises:
   providing a motor-driven dispensing element mounted for rotation about an axis of oscillation or partial rotation, and having a duct substantially shaped as an elbow, extending transversely with respect to said axis of oscillation, one end of said duct being in communication with a granular material feeding source, whereas its other end constantly contains granular material,
   causing said dispensing element to swivel or oscillate to discharge granules through said other end in a pulsated manner through a number of cycles corresponding to a specified amount of granules to be dispensed, and
   stopping any oscillation of said dispensing element upon reaching a predetermined weight threshold of discharged-dispensed granules.

2. A method as claimed in claim 1, comprising a step of detecting the weight of the granules dispensed-discharged by said dispensing element.

3. A method as claimed in claim 1, wherein oscillation angle of said dispensing element is a function of the inner light size of said duct.

4. A method as claimed in claim 3, wherein swivelling angle of said dispensing element is in the range from 10 and 90 degrees.

5. A high precision metering device for granular material which comprises at least one dispensing element, driving means arranged to control said dispensing element, and a program control unit suitable for controlling said driving means and stopping upon reaching a predetermined amount of granules dispensed by said dispensing element, and wherein said dispensing element, or each dispensing element, is mounted for rotation about an axis of oscillation or partial rotation and has a duct substantially shaped as an elbow extending transversely with respect to said axis of oscillation, thereby having a first substantially vertical duct portion that, in use, is permanently filled with granular material, and a second duct portion extending in a transverse direction with respect to said first portion and in communication therewith, thus constantly containing granular material which, in a rest condition, is kept therewithin owing to angled structure of said dispensing element, and wherein said driving means is designed to cause, upon control, said dispensing element to rotate or swivel about said axis of oscillation, thereby causing granules of material to be released from said second portion of said dispensing element each time said dispensing element is caused to oscillate or partly rotate.

6. A device as claimed in claim 5, wherein said dispensing element is shaped as a substantially cylindrically shaped rotor.

7. A device as claimed in claim 6, wherein said dispensing element is made of a light material.

8. A device as claimed in claim 7, wherein said dispensing element is covered with a metal jacket.

9. A device as claimed in claim 6, wherein said first duct portion has an inner light tapering towards said second duct portion.

10. A device as claimed in claim 6, comprising a pair of support lugs or pins arranged opposite to one another and axially aligned for rotatably supporting said dispensing element.

11. A device as claimed in claim 5, wherein said driving means comprises a linear actuator.

12. A device as claimed in claim 11, wherein said linear actuator comprises a fluid-operated cylinder and piston assembly.

13. A device as claimed in claim 5, wherein said driving means comprises an on-off electrovalve arranged to be controlled by said control unit.

14. A device as claimed in claim 13, wherein said on-off electrovalve is located close to said source of granular material.

15. A device as claimed in claim 13, wherein said on-off electrovalve is arranged to be connected to said control unit by means of at least one connecting device.

16. A device as claimed in claim 5, comprising a motion transmission assembly between said driving means and said dispensing element.

17. A device as claimed in claim 13, wherein said driving assembly comprises a rack controlled by said linear actuator and a toothed wheel integral in rotation with said rotor and meshing with said rack.

18. A device according to claims 5 to 17, wherein, in use, said dispensing element swivels through an angle in the range from 10 to 90 degrees.

19. A device as claimed in claim 18, comprising a support frame designed removably and rotatably to support said dispensing element.

20. A device as claimed in claim 5, comprising sensing means for detecting the amount of granules dispensed by said dispensing element.

21. A device as claimed in claim 20, wherein said sensing means comprises an electronic balance.

* * * * *